(12) United States Patent
Hawwa et al.

(10) Patent No.: US 9,046,427 B2
(45) Date of Patent: Jun. 2, 2015

(54) SYSTEM FOR DUAL PRESSURE SENSING

(75) Inventors: Muhammad A. Hawwa, Dhahran (SA); Kamal Youcef-Toumi, Cambridge, MA (US); Hussain Al-Qahtani, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 277 days.

(21) Appl. No.: 13/411,681

(22) Filed: Mar. 5, 2012

(65) Prior Publication Data
US 2012/0255363 A1    Oct. 11, 2012

Related U.S. Application Data

(60) Provisional application No. 61/473,973, filed on Apr. 11, 2011.

(51) Int. Cl.
| | |
|---|---|
| *G01L 9/00* | (2006.01) |
| *G01L 7/04* | (2006.01) |
| *G01L 7/06* | (2006.01) |
| *G01L 7/08* | (2006.01) |
| *G01L 15/00* | (2006.01) |
| *G01L 27/00* | (2006.01) |

(52) U.S. Cl.
CPC ............... *G01L 9/0072* (2013.01); *G01L 7/045* (2013.01); *G01L 7/065* (2013.01); *G01L 7/086* (2013.01); *G01L 9/0079* (2013.01); *G01L 15/00* (2013.01); *G01L 27/007* (2013.01)

(58) Field of Classification Search
USPC .................................................. 73/700–756
See application file for complete search history.

(56) References Cited

U.S. PATENT DOCUMENTS

| 4,884,450 | A | 12/1989 | Greenwood et al. | |
|---|---|---|---|---|
| 5,319,978 | A | 6/1994 | Grudzien, Jr. | |
| 2005/0062979 | A1 | 3/2005 | Zhu et al. | |
| 2005/0241399 | A1* | 11/2005 | Lopushansky et al. | 73/706 |
| 2007/0107502 | A1* | 5/2007 | Degertekin | 73/105 |
| 2011/0170108 | A1* | 7/2011 | Degertekin | 356/454 |
| 2013/0278937 | A1* | 10/2013 | Degertekin | 356/501 |
| 2013/0296708 | A1* | 11/2013 | Zuzak et al. | 600/476 |

OTHER PUBLICATIONS

International Search Report and Written Opinion issued in connection with International Patent Application No. PCT/US2012/028240 mailed on Jul. 2, 2012.
International Preliminary Report on Patentability in regard to PCT/US2012/028240 mailed on Oct. 24, 2013.

* cited by examiner

*Primary Examiner* — Andre Allen
(74) *Attorney, Agent, or Firm* — Sam Pasternack; MIT Technology Licensing Office

(57) ABSTRACT

Pressure sensor. The sensor includes a deformable diaphragm responsive to applied pressure and a rigid beam mounted to move as the diaphragm deforms. The rigid beam includes a mirrored surface for receiving light from and reflecting light into an optical fiber thereby forming a Fabry-Perot cavity to detect changes in the position of the rigid beam. The rigid beam further includes inter-digital fingers extending from the mirrored surface and moving with the rigid beam with respect to fixed inter-digital fingers to create a change in electrical charges in the fingers to detect changes in the position of the rigid beam thereby providing two measures of rigid beam displacement which are measures of pressure. In a preferred embodiment, the optical fiber is a single mode optical fiber.

3 Claims, 1 Drawing Sheet

SYSTEM FOR DUAL PRESSURE SENSING

This application claims priority to provisional application No. 61/473,973 filed on Apr. 11, 2011, the contents of which is incorporated herein by reference,

BACKGROUND OF THE INVENTION

This invention relates to pressure sensing and more particularly to a pressure sensor having two pressure probes packaged together.

A sensor is a physical device that detects, or senses, a signal or physical condition. Some sensors are particularly adapted to detect chemical compounds. In an ideal situation, the output signal of a sensor is exactly proportional to the value of the property to be measured. An acceptable sensor should be sensitive to the measured property but relatively insensitive to other properties and the sensor should not influence the property to be measured.

Two measures are normally used for evaluating a sensor. A first measure is accuracy which is the degree of conformity to a standard (or true) value of a measured parameter when a sensor is operated under specified conditions. The other important measure is reproducibility which is the closeness of agreement under repeated sensor outputs for the same process variables under the same conditions when approaching from various directions.

In many situations, sensors lose their accuracy due to surrounding environmental factors, Such factors include, for example, temperature and humidity. Both the values of such surrounding environmental factors and the time rate of change of these physical properties contribute to shifting of the sensors' readings from the correct values. Thermal and moisture drifting is a common problem in sensors. Both of these environmental factors can lead to mechanical drawbacks such as adhesive swelling, and/or electrical properties changes.

SUMMARY OF THE INVENTION

The pressure sensor according to the invention includes a deformable diaphragm responsive to applied pressure and a rigid beam mounted to move as the diaphragm deforms. The rigid beam includes a mirrored surface for receiving light from and reflecting light into an optical fiber thereby forming a Fabry-Perot cavity to detect changes in the position of the rigid beam. The rigid beam further includes inter-digital fingers extending from the mirrored surface and moving with the rigid beam with respect to fixed inter-digital fingers to create a change in electrical charges in the fingers to detect changes in the position of the rigid beam. The pressure sensor thereby provides two measures of the rigid beam displacement which are measures of pressure. In a preferred embodiment, the optical fiber is a single mode optical fiber, it is also preferred that the rigid beam be supported by at least one spring.

DESCRIPTION OF THE PREFERRED EMBODIMENT

The present invention is a sensing system having two probes packaged together. The first probe is a Fabry-Perot probe that acts on optical physics principles and the second probe is a MEMS probe acting on electrostatic principles. The two sensors thus provide a check on one another.

Figure 1:
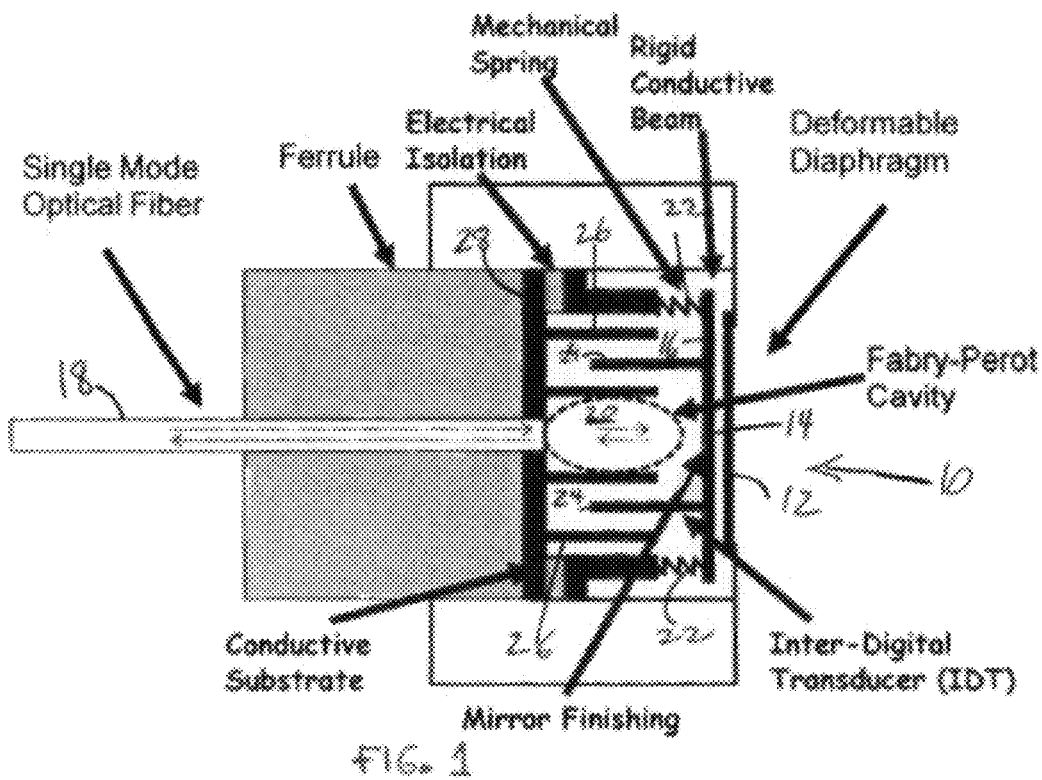
FIG. 1 is a schematic illustration of an embodiment of the invention disclosed herein.

With reference first to FIG. 1, a sensor 10 includes a deformable diaphragm 12 that deforms in the presence of pressure. The deformable diaphragm 12 is disposed proximate a rigid beam 14 that moves when the diaphragm 12 deforms. The rigid beam 14 includes a mirrored surface 16 that is adapted to receive light from and to reflect light into an optical fiber 18. It is preferred that the optical fiber 18 be a single mode optical fiber. The combination of the mirrored surface 16 and the optical fiber 18 form a Fabry-Perot cavity 20. The optical connectivity of the Fabry-Perot sensor part of the invention is well known to those of skill in this field. The Fabry-Perot cavity 20 detects changes in the optical path length induced either by a change in the refractive index or a change in physical length of the cavity 20. This aspect of the invention is based on a change in the physical length of the cavity.

There have been an increasing number of fiber optic sensors based on the use of a Fabry-Perot cavity as a sensing element. It is also known that Fabry-Perot sensors can be configured in various ways such that they can measure a variety of parameters.

It is known to make low cost, miniature Fabry-Perot sensors using micromachining techniques (MEMS). The Fabry-Perot cavity 20 may be made by a manufacturing method described by Gander et al., "Embedded micromachined fiber-optic Fabry-Perot pressure sensors in aerodynamics applications," IEEE Sensors Journal, Vol. 3, no. 1 (2003). See also, Kim et al., "Micromachined Fabry-Perot cavity pressure transducer with optical fiber interconnects," SPIE Vol, 2642, (1995).

A variety of techniques have been proposed for interrogating a Fabry-Perot cavity. See, for example, U.S. Pat. Nos. 4,678,904 and 5,392,117. These literature articles and issued patents are incorporated herein by reference in their entirety.

Returning to FIG. 1, the rigid beam 14 is supported through springs 22. The springs 22 are important for providing restoring forces for this MEMS device. The MEMS portion of the present sensor includes inter-digital transducer fingers 24 extending from the mirrored surface 16 and inter-digital transducer fingers 26 extending from a conductive substrate 28. The inter-digital fingers 24 and 26 are overlapping as shown in F*igs*. 1 and 2.

Figure 2:
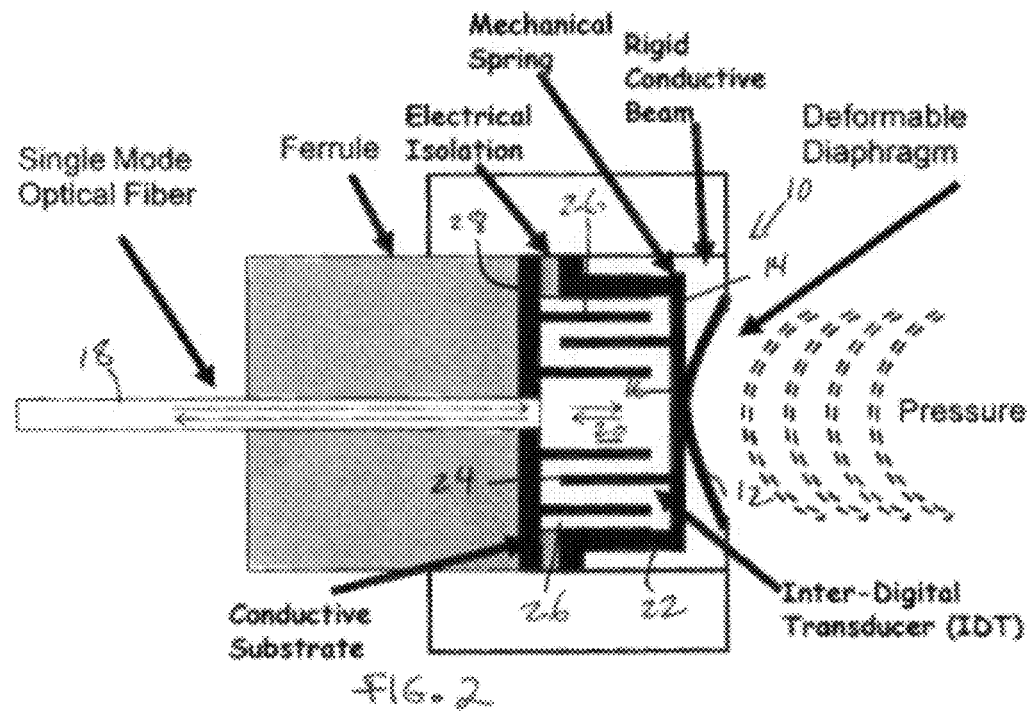
FIG. 2 is an embodiment of the invention disclosed herein showing a force applied to the diaphragm.

With reference now to FIGS. 1 and 2, pressure fluctuations deflect the diaphragm 12 to move the inter-digital transducer fingers 24 with respect to the fixed inter-digital transducer fingers 26. The movement of the fingers toward and away from each other creates a change in electrical charges that can be measured to quantify the amount of displacement as will be apparent to those of ordinary skill in the art. The measured electrical signal, proportional to displacement, is then converted to a pressure or force observed by the electrostatic MEMS portion of the invention.

The invention disclosed herein thus provides two probes that ideally indicate the same value of the measured pressure/force. The reading of one probe is in fact checked simultaneously by the other probe.

Because the two probes are acting on different physics principles, the degree each one of them is affected by environmental conditions will be different. If one of the probes is highly affected by a certain environmental factor, for example temperature, the other probe will possibly be affected to a lesser degree. Hence, if one or both systems are affected by environmental, connectivity, or noise in one way or another, the readings of the two systems will not he consistent. Therefore, any disagreement in the two probes' readings will indicate an inaccurate reading. The system disclosed herein thus provides a real time checking on a pressure/force measurement with the capability at an early stage to capture a wrong measurement.

It is recognized that modifications and variations of the present invention will be apparent to those of ordinary skill in the art and it is intended that all such modifications and variations be included within the scope of the appended claims.

What is claimed is:

1. Pressure sensor comprising:
   a deformable diaphragm responsive to applied pressure; and
   a rigid beam mounted to more as the diaphragm deforms; wherein the rigid beam includes a mirrored surface for receiving light from and reflecting light into an optical fiber thereby forming a Fabry-Perot cavity to detect changes in the position of the rigid beam;
   and wherein the rigid beam further includes first inter-digital fingers extending from the mirrored surface and moving with the rigid beam with respect to second, fixed inter-digital fingers, the first and second inter-digital fingers overlapping to create a change in electrical charges in the fingers to detect changes in the position of the rigid beam thereby providing two measures of rigid beam displacement which are measures of pressure.

2. The pressure sensor of claim 1 wherein the optical fiber is a single mode optical fiber.

3. The pressure sensor of claim 1 wherein the rigid beam is supported by at least one spring.

* * * * *